US008086681B2

(12) United States Patent
Ochi

(10) Patent No.: US 8,086,681 B2
(45) Date of Patent: Dec. 27, 2011

(54) IMAGE FORMING APPARATUS

(75) Inventor: Kengo Ochi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 102 days.

(21) Appl. No.: 12/318,455

(22) Filed: Dec. 30, 2008

(65) Prior Publication Data

US 2009/0193089 A1 Jul. 30, 2009

(30) Foreign Application Priority Data

Jan. 30, 2008 (JP) ................................. 2008-019708

(51) Int. Cl.
*G06F 15/16* (2006.01)
(52) U.S. Cl. ........................................ 709/206; 709/200
(58) Field of Classification Search .................. 709/206
See application file for complete search history.

(56) References Cited

U.S. PATENT DOCUMENTS

| 4,677,614 | A | * | 6/1987 | Circo ............................. 370/222 |
| 5,321,812 | A | * | 6/1994 | Benedict et al. ............... 709/223 |
| 5,751,960 | A | * | 5/1998 | Matsunaga ..................... 709/206 |
| 5,848,248 | A | * | 12/1998 | Kawasaki et al. ............. 709/238 |
| 5,995,594 | A | * | 11/1999 | Shaffer et al. ............... 379/88.12 |
| 6,018,760 | A | * | 1/2000 | Oishi et al. ..................... 709/204 |
| 6,021,427 | A | * | 2/2000 | Spagna et al. ................. 709/206 |
| 6,349,335 | B1 | * | 2/2002 | Jenney ........................... 709/224 |
| 6,549,957 | B1 | * | 4/2003 | Hanson et al. ..................... 710/5 |
| 6,631,398 | B1 | * | 10/2003 | Klein ............................. 709/206 |
| 6,701,346 | B1 | * | 3/2004 | Klein ............................. 709/206 |
| 6,810,408 | B1 | * | 10/2004 | Bates et al. .................... 709/200 |
| 6,985,923 | B1 | * | 1/2006 | Bates et al. .................... 709/206 |
| 6,987,580 | B2 | * | 1/2006 | Watanabe et al. ............. 358/1.15 |
| 7,142,550 | B1 | * | 11/2006 | Umansky ....................... 370/401 |
| 7,529,680 | B2 | * | 5/2009 | Sunday et al. ................. 705/309 |
| 7,675,869 | B1 | * | 3/2010 | Anker et al. ................... 370/255 |
| 7,831,707 | B2 | * | 11/2010 | Bardsley ........................ 709/224 |
| 2002/0194307 | A1 | * | 12/2002 | Anderson et al. ............. 709/219 |
| 2004/0078438 | A1 | * | 4/2004 | Pyle et al. ...................... 709/206 |
| 2005/0021647 | A1 | * | 1/2005 | Maeda ........................... 709/206 |
| 2005/0044154 | A1 | * | 2/2005 | Kaminski et al. ............. 709/206 |
| 2005/0066005 | A1 | * | 3/2005 | Paul ............................... 709/206 |
| 2005/0188028 | A1 | * | 8/2005 | Brown et al. .................. 709/206 |
| 2005/0188037 | A1 | * | 8/2005 | Hamaguchi .................... 709/206 |
| 2005/0198270 | A1 | * | 9/2005 | Rusche et al. ................. 709/224 |
| 2006/0031307 | A1 | * | 2/2006 | Bhatia ............................ 709/206 |
| 2006/0259545 | A1 | * | 11/2006 | Garza et al. ................... 709/203 |
| 2007/0100951 | A1 | * | 5/2007 | Bae ................................ 709/206 |
| 2007/0112946 | A1 | * | 5/2007 | Savov ............................ 709/223 |
| 2007/0124383 | A1 | * | 5/2007 | Hebert et al. .................. 709/206 |

(Continued)

FOREIGN PATENT DOCUMENTS

JP 10-207795 8/1998

(Continued)

*Primary Examiner* — John Follansbee
*Assistant Examiner* — Anthony Mejia
(74) *Attorney, Agent, or Firm* — Rabin & Berdo, P.C.

(57) ABSTRACT

An image forming apparatus transmitting and receiving electronic mail within a network includes an identification information storage unit, a loop mail judgment unit, and a loop mail process control unit. The identification information storage unit stores identification information. The loop mail judgment unit judges whether or not the electronic mail is loop mail based on the identification information stored in the identification information storage unit. The loop mail process control unit executes a process arranged beforehand with respect to the electronic mail received based on judgment of the loop mail judgment unit.

12 Claims, 12 Drawing Sheets

U.S. PATENT DOCUMENTS

| | | | |
|---|---|---|---|
| 2008/0071865 A1* | 3/2008 | Dutta | 709/206 |
| 2008/0133676 A1* | 6/2008 | Choisser et al. | 709/206 |
| 2008/0288598 A1* | 11/2008 | French et al. | 709/206 |
| 2009/0157708 A1* | 6/2009 | Bandini et al. | 707/100 |
| 2009/0216842 A1* | 8/2009 | Risher et al. | 709/206 |
| 2009/0234922 A1* | 9/2009 | Appelman | 709/206 |
| 2009/0287804 A1* | 11/2009 | Banks et al. | 709/223 |
| 2010/0146058 A1* | 6/2010 | Naef | 709/206 |
| 2010/0153325 A1* | 6/2010 | Amoroso et al. | 706/46 |
| 2010/0179999 A1* | 7/2010 | McCarthy et al. | 709/206 |
| 2010/0185740 A1* | 7/2010 | Lee et al. | 709/206 |
| 2010/0304768 A1* | 12/2010 | Murtagh et al. | 455/466 |
| 2011/0022696 A1* | 1/2011 | Bardsley | 709/223 |

FOREIGN PATENT DOCUMENTS

| | | |
|---|---|---|
| JP | 2001-290735 A | 10/2001 |
| JP | 2002-208959 A | 7/2002 |
| JP | 2005-115532 A | 4/2005 |

* cited by examiner

FIG. 6

```
From:c@example.com
To:a@example.com
Subject:Test Result
Date:Sat, 07 Jul 2007 08:07:07 + 0700
Mime-Version:1.0
Content-Type: text/plain charset=us-ascii
X-Transfer:MFP-A -> MFP-B -> MFP-C -> MFP-A -> MFP-B -> MFP-C This is your test result.
Result : PASSED
Score : 80 / 100
```

FIG. 9

From:a@example.com
To:user1@example.com
Subject: Loop Mail [ID:MFP-A-0001]
Date:Sat, 07 Jul 2007 07:07:07 + 0700
Mime-Version:1.0
Content-Type: text/plain charset=us-ascii The loop mail is detected on MFP-A.
If you hope to cancel the loop mail, please
reply this mail (not delete [ID:MFP-A-0001] in
subject ).

=== Loop mail body text is here.===
This is your test result.
Result : PASSED
Score : 80 / 100
=============================

FIG. 10

From:user1@example.com
To:a@example.com
Subject: Re:Loop Mail [ID:MFP-A-0001]
Date:Sat, 07 Jul 2007 10:07:07 + 0700
Mime-Version:1.0
Content-Type: text/plain charset=us-ascii

FIG.11

```
From:a@example.com
To:b@example.com
Subject:Test Result
Date:Sat, 07 Jul 2007 10:07:17 + 0700
Mime-Version:1.0
Content-Type: text/plain charset=us-ascii
X-Transfer:MFP-A -> MFP-B -> MFP-C -> MFP-A -> MFP-B -> MFP-C -> MFP-A
X-Loop:MFP-A-0001

This is your test result.
Result : PASSED
Score : 80 / 100
```

```
From:aa@example.com
To:group1@example.com
Subject:Test Result
Date:Sat, 07 Jul 2007 07:07:07 + 0700
Mime-Version:1.0
Content-Type: text/plain charset=us-ascii This is your test result.
Result : PASSED
```

FIG. 16

PRIOR ART

| DEVICE NAME | DEVICE ID | MAIL ADDRESS | FORWARD SETTING | |
|---|---|---|---|---|
| | | | TRANSMITTING SOURCE | DESTINATION |
| MULTIFUNCTIONAL PERIPHERAL X | MFP-X | x@example.com | ALL | y@example.com |
| MULTIFUNCTIONAL PERIPHERAL Y | MFP-Y | y@example.com | x@example.com | z@example.com |
| MULTIFUNCTIONAL PERIPHERAL Z | MFP-Z | z@example.com | y@example.com | x@example.com |

# IMAGE FORMING APPARATUS

BACKGROUND OF THE INVENTION

1. Field of the Invention

The present invention relates to an image forming apparatus having a function of transmitting and receiving electronic mail.

2. Description of Related Art

A related art image forming apparatus automatically forwards electronic mail received to another device based on a forward setting so as to reduce an increase in traffic caused by a state that the electronic mail is repeatedly transmitted and received within a network, that is, an infinite loop state of the electronic mail. Such a related art image forming apparatus is disclosed in Japanese Un-examined Patent Application Publication No. H10-207795, for example.

A user of such a related art image forming apparatus disclosed in the above document, however, is unable to know the forward setting of another device beforehand in a case of performing the forward setting thereof. Consequently, for example, in a case where the forward setting is mistakenly performed among multifunctional peripherals X, Y, and Z as illustrated in FIG. 16, all the electronic mail received by the multifunctional peripheral X is forwarded to the multifunctional peripheral X again. As a result, the electronic mail is likely to fall in to the infinite loop state, that is, loop mail, without intention of the user. Therefore, the user needs to grasp the forward setting of another device within the network beforehand to reduce such loop mail.

The present invention provides an image forming apparatus capable of reducing occurrences of forwarding loop mail to another device in a case where the loop mail is forwarded to the image forming apparatus thereof through a plurality of devices within a network.

BRIEF SUMMARY OF THE INVENTION

According to one aspect of the invention, an image forming apparatus transmitting and receiving electronic mail within a network includes: an identification information storage unit storing identification information; a loop mail judgment unit judging whether or not the electronic mail is loop mail based on the identification information stored in the identification information storage unit; and a loop mail process control unit executing a process arranged beforehand with respect to the electronic mail received based on judgment of the loop mail judgment unit.

Additional features and advantages of the present invention will be more fully apparent from the following detailed description of embodiments, the accompanying drawings and the associated claims.

BRIEF DESCRIPTION OF THE DRAWINGS

A more complete appreciation of the aspects of the invention and many of the attendant advantage thereof will be readily obtained as the same becomes better understood by reference to the following detailed description when considered in connection with the accompanying drawings, wherein:

FIG. 6 is a schematic diagram illustrating an example of forward mail;

FIG. 9 is a schematic diagram illustrating an example of notification mail;

FIG. 10 is a schematic diagram illustrating an example of reply mail;

FIG. 11 is a schematic diagram illustrating an example of forward mail;

FIG. 16 is a schematic diagram illustrating an example of prior art forward setting of electronic mail.

DETAILED DESCRIPTION OF PREFERRED EMBODIMENTS

Figure 1:
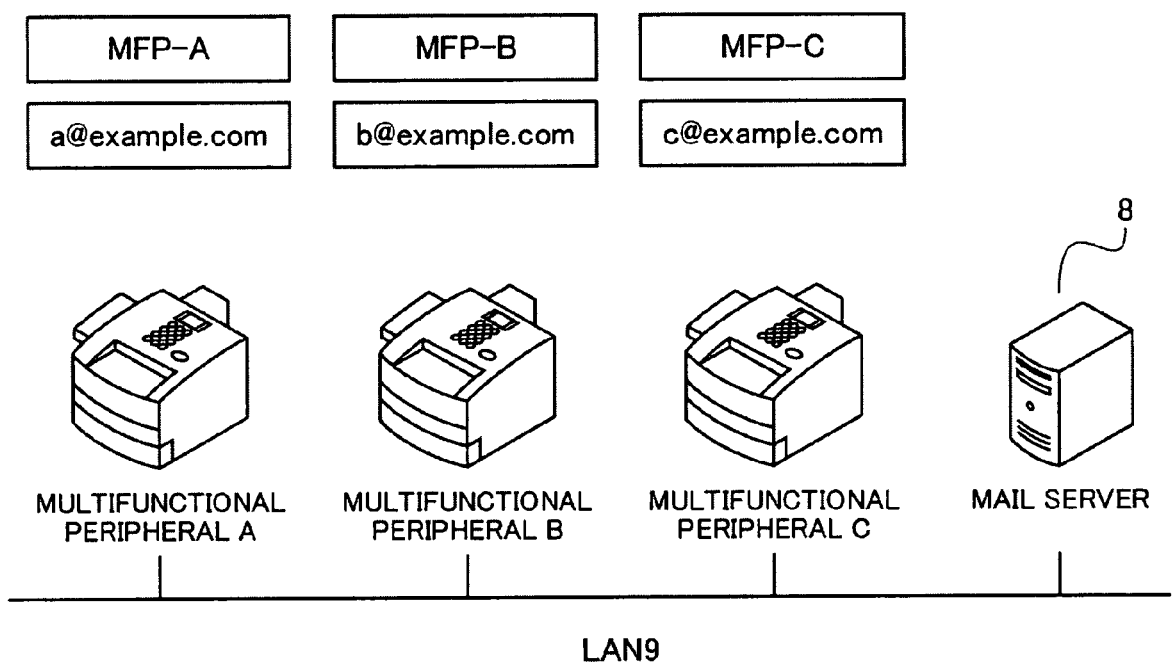
FIG. 1 is a schematic diagram illustrating an example of a network connected with a multifunctional peripheral serving as an image forming apparatus according to a first embodiment of the present invention.

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, like reference numerals designate identical or corresponding parts throughout the several views. A multifunctional peripheral serving as an image forming apparatus according to an embodiment of the present invention is described.

First Embodiment

Referring to FIG. 1, an example of a network connected with a multifunctional peripheral A serving as the image forming apparatus is illustrated in a schematic diagram. In the network as illustrated in FIG. 1, three multifunctional peripherals serving as image forming apparatuses such as the multifunctional peripheral A, a multifunctional peripheral B, and a multifunctional peripheral C, and a mail server 8 are connected through a local area network (LAN) 9. Each of the multifunctional peripherals A, B, and C has a mail address and device ID. For example, the multifunctional peripheral A has the mail address of "a@example.com" and the device ID of "MFP-A." The multifunctional peripheral B has the mail address of "b@example.com" and the device ID of "MFP-B." The multifunctional peripheral C has the mail address of "c@example.com" and the device ID of "MFP-C." Each of the multifunctional peripherals A, B, and C is arranged such that the electronic mail is transmitted and received through the mail server 8.

Figure 2:
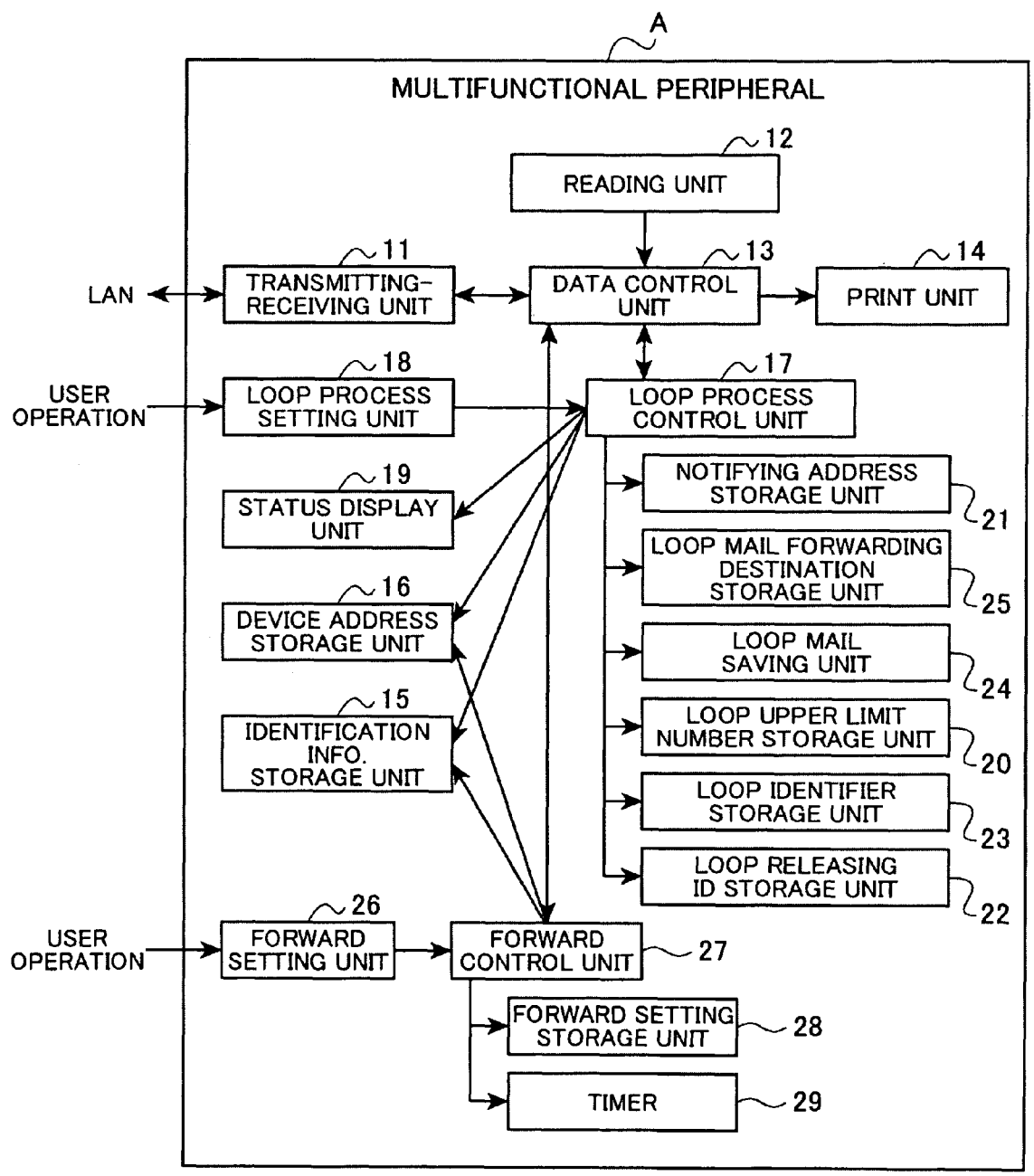
FIG. 2 is a block diagram illustrating essential portions of the multifunctional peripheral of FIG. 1.

Referring to FIG. 2, essential parts of the multifunctional peripheral A are illustrated in a block diagram. The multifunctional peripheral A includes: a transmitting-receiving unit 11 transmitting and receiving the electronic mail; a reading unit 12 reading an image from an original document and the like; a data control unit 13 serving as an identification information addition unit; a print unit 14 converting image data into print image data and printing on a recording medium; an identification information storage unit 15 and a device address storage unit 16 serving as identification information storage units; a loop process control unit 17 serving as a loop judgment unit and a loop mail process control unit; a loop process setting unit 18 receiving a setting of a loop mail process to be executed by the loop process control unit 17; a status display unit 19 displaying information relating to loop mail; at least one of a loop upper limit number storage unit 20, a notifying address storage unit 21, a loop releasing ID storage unit 22, a loop identifier storage unit 23, a loop mail saving unit 24 and a loop mail forwarding destination storage unit 25 storing therein information of a process to be executed with respect to the loop mail; and a forward setting unit 26, a forward control unit 27, a forward setting storage unit 28, and a timer 29 relating to forwarding the electronic mail.

The transmitting-receiving unit 11 transmits and receives data through the LAN 9. The transmitting-receiving unit 11 receives the electronic mail using, for example, a post office protocol (POP) version 3, or an Internet message access protocol (IMAP). The transmission of the electronic mail is performed using a simple mail transfer protocol (SMTP) and the like. Moreover, the transmitting-receiving unit 11 is connected to the data control unit 13 through a signal line so as to deliver the data through the signal line. The reading unit 12, for example, includes a scanner, and the image read by the scanner is transmitted to the control unit 13 as the image data.

The data control unit 13 receives the data from the transmitting-receiving unit 11 or the reading unit 12 and executes a necessary process. The data control unit 13, for example, transmits the image data received from the reading unit 12 to the print unit 14 so as to print the image data on the recording medium. The data control unit 13 supplies the instruction to each of the loop process control unit 16 and the forward control unit 25 to execute a processe relating to the electronic mail received from the transmitting-receiving unit 11. The print unit 14 includes a print mechanism and converts the image data received from the data control unit 13 into the print image data, thereby printing the image on the recording medium.

The identification information storage unit 15 serves as a nonvolatile storage region having a nonvolatile memory storing therein identification information allocated to the multifunctional peripheral. For example, the identification information storage unit 15 of the multifunctional peripheral A stores "MFP-A" as the device ID therein. The device address storage unit 16 serves as a nonvolatile storage region having a nonvolatile memory storing therein the mail address allocated to the multifunctional peripheral. For example, the device address storage unit 16 of the multifunctional peripheral A stores "a@example.com" therein.

The loop process control unit 17 retrieves the device ID stored in the identification information storage unit 15 or the mail address stored in the device address storage unit 16. The loop process control unit 17 compares the retrieved device ID or the retrieved mail address with a device ID or a mail address included in a source of the electronic mail received, and judges whether or not the electronic mail is the loop mail. The loop process control unit 17 executes the loop mail process arranged beforehand with respect to the loop mail. Moreover, the loop process control unit 17 stores a setting content transmitted from the loop process setting unit 18 in the notifying address storage unit 21 and the loop mail forwarding destination storage unit 25.

The loop process setting unit 18 receives the setting of the loop mail process. Such a loop mail process can be arranged using an operation panel disposed in the multifunctional peripheral A. According to the first embodiment, the executable loop mail process includes a notifying process, a deleting process, a saving process, a forwarding process, and a status display process.

The notifying process notifies the mail address stored in the notifying address storage unit 21 through the electronic mail of a situation in which the received electronic mail is the loop mail. Moreover, the notifying process forwards the received electronic mail with respect to the mail address set by the forward setting unit 26. The deleting process deletes the loop mail. The saving process saves the loop mail in the loop mail saving unit 24. The forwarding process forwards the loop mail with respect to the mail address set as a shelter destination of the loop mail so that the loop mail escapes from being in an infinite loop state. Such a shelter destination is stored in the loop mail forwarding destination storage unit 25. The status display process displays the presence of the loop mail in the status display unit 19. The loop process control unit 17 executes a process with respect to the loop mail based on the content set by the loop process setting unit 18.

The status display unit 19 displays the presence of the loop mail in the loop process setting unit 18 and the status display process. The operation panel disposed in the multifunctional peripheral A can be used as the status display unit 19.

The loop upper limit number storage unit 20 serves as a nonvolatile storage region storing therein an upper limit value of a number of loop times of the loop mail. In the notifying process, the notifying address storage unit 21 serves as a nonvolatile storage region storing therein mail address information of destination to which notification mail is transmitted. Here, the notification mail notifies that the received electronic mail is the loop mail. In the notifying process, the loop releasing ID storage unit 22 serves as a nonvolatile storage region storing therein a loop identifier inserted in reply mail with respect to the notification mail as a loop releasing ID. A description of the loop releasing ID is given later. In the notifying process, the loop identification storage unit 23 serves as a nonvolatile storage region storing the loop identifier inserted in the electronic mail forwarded. In the saving process, the loop mail saving unit 24 serves as a nonvolatile storage region storing the loop mail. In the forwarding process, the loop mail forwarding destination storage unit 25 serves as a nonvolatile storage region storing the mail address information set as the shelter destination.

A nonvolatile memory such as a flash memory, an ultra violet erasable programmable read only memory (UV-EPROM), and an electronically erasable and programmable read only memory (EEPROM) can be used as a storage medium having a storage region of the loop upper limit number storage unit 20, the notifying address storage unit 21, the loop identifier storage unit 22, the loop releasing ID storage unit 23, the loop mail saving unit 24 or the loop mail forwarding address storage unit 25. In a case where such a storage medium is used, one storage unit can be allocated in the storage region of one storage medium. However, the storage region of one storage medium can be divided into a plurality of storage regions, and the storage unit can be allocated in each of plural storage regions divided.

The forward setting unit 26 receives a setting relating to forwarding the received electronic mail. The forward setting can be performed by inputting a transmitting source and a forwarding destination of the electronic mail. A user can perform the forward setting using the operation panel disposed in the multifunctional peripheral A, and a content set by the forward setting unit 26 is transmitted to the forward control unit 27. The forward control unit 27 judges whether or not to forward the electronic mail received upon receiving the instruction from the data control unit 13. Moreover, the forward control unit 27 stores the setting content transmitted from the forward setting unit 26 in the forward setting storage unit 28. The forward setting storage unit 28 serves as a non-volatile storage region storing therein the setting content set by the forward setting unit 26.

The timer 29 measures a time period, based on the instruction of the forward control unit 27, between a time at which the electronic mail is received and a time at which the electronic mail is forwarded.

Figure 3:
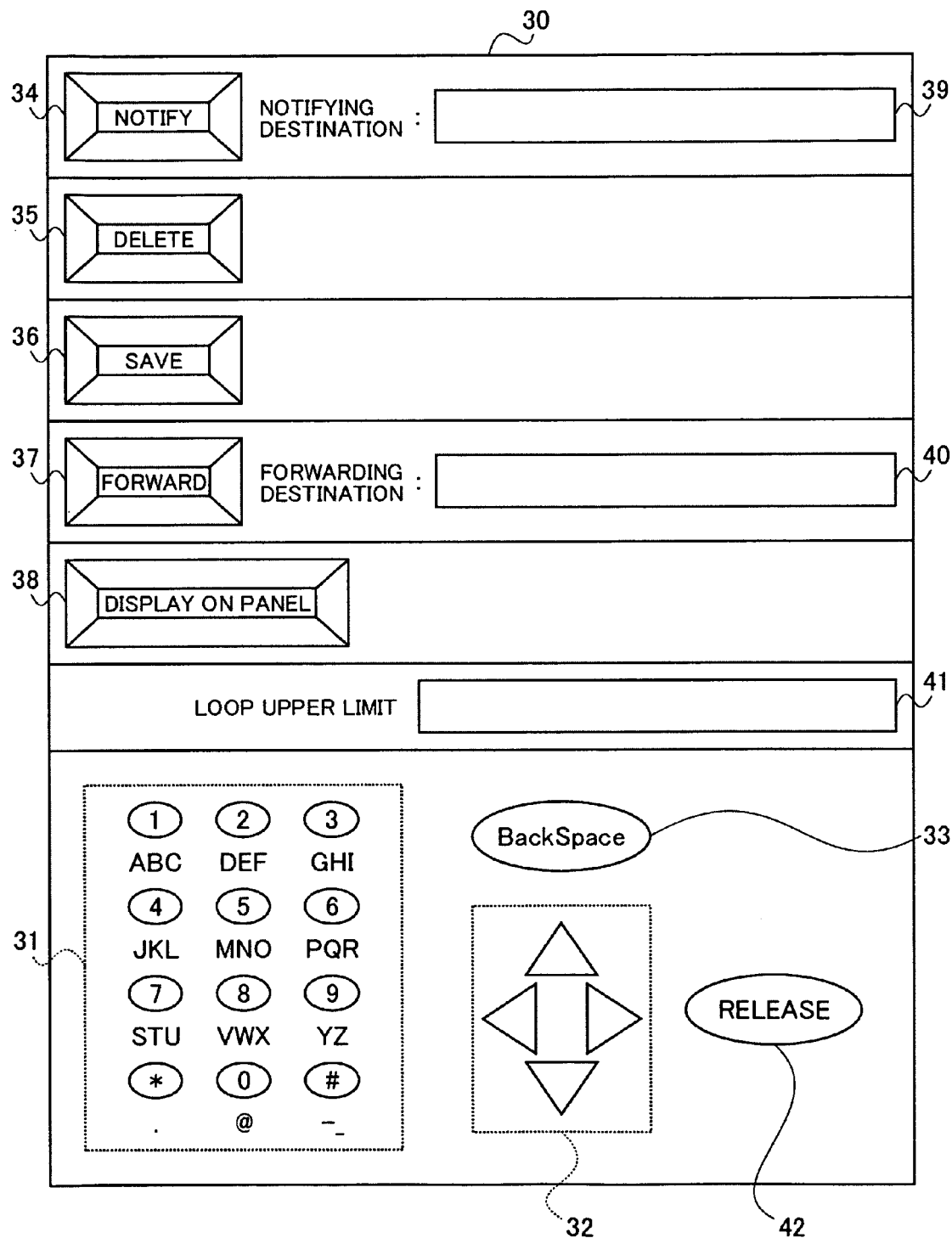
FIG. 3 is a schematic diagram illustrating an operation panel as an example of a loop process setting unit.

Now, a description of the operation panel disposed in the multifunctional peripheral A is provided with reference to FIG. 3. An operation panel 30 serves as the loop process setting unit 18 in the multifunctional peripheral A. The operation panel 30 includes a numeric keypad 31, a cursor key 32, a backspace key 33, a "NOTIFY" radio button 34, a "DELETE" radio button 35, a "SAVE" radio button 36, a "FORWARD" radio button 37, a "DISPLAY ON PANEL" radio button 38, a notifying destination input box 39 in which a notifying destination address of the electronic mail is input, a mail address input box 40 in which a forwarding destination address of the electronic mail set as the shelter destination of the loop mail is input, a loop upper limit input box 41, and a releasing push button 42 used to clear the setting content.

In a case where the use presses the "NOTIFY" radio button 34, the loop process setting unit 18 receives a selection of the notifying process as the loop mail process. The user presses the "NOTIFY" radio button 34 and inputs the notifying destination address of the electronic mail in the notifying destination input box 39. Similarly, in a case where the user presses the "DELETE" radio button 35, the "SAVE" radio button 36, the "FORWARD" radio button 37, and the "DISPLAY ON PANEL" radio button 38, the loop process setting unit 18 receives the selections of the deleting process, saving process, forwarding process, and status display process respectively as the loop mail processes. In a case where the user selects the forwarding process, the user inputs the destination address of the electronic mail set as the shelter destination of the loop mail in the mail address input box 40. The user inputs the upper limit value of a number of loop times of the loop mail in the loop upper limit input box 41, and the user can optionally arrange the upper limit value.

The "NOTIFY," "DELETE," "SAVE," "FORWARD," and "DISPLAY ON PANEL" radio buttons 34, 35, 36, 37 and 38 cannot be selected simultaneously, and only one of the radio buttons 34 through 38 can be selected at one time. The loop process control unit 17 executes a process with respect to the loop mail based on the loop mail process selected by the user.

Figure 4:
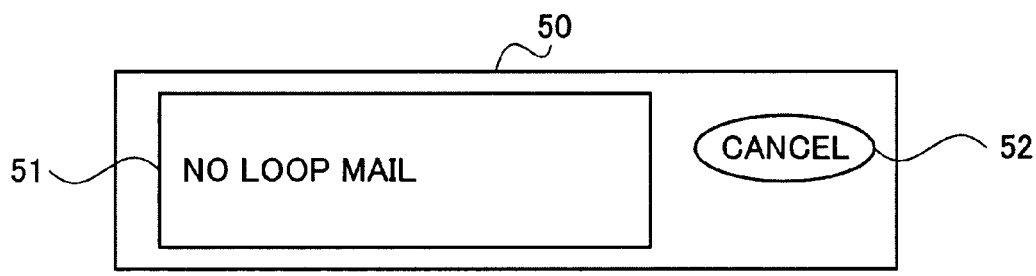
FIG. 4 is a schematic diagram illustrating a panel as an example of a status display unit.

A description of a panel 50 serving as the status display unit 19 is provided with reference to FIG. 4. The panel 50 includes a display region 51 and a push button 52. In a case where the status display process is selected by the user, the loop process control unit 17 displays information relating to the presence or absence of the loop mail in the display region 51. In a case where the information indicating the presence of the loop mail is displayed in the display region 51, the push button 52 serves as a button receiving an instruction to execute the deletion of the loop mail.

Figure 5:
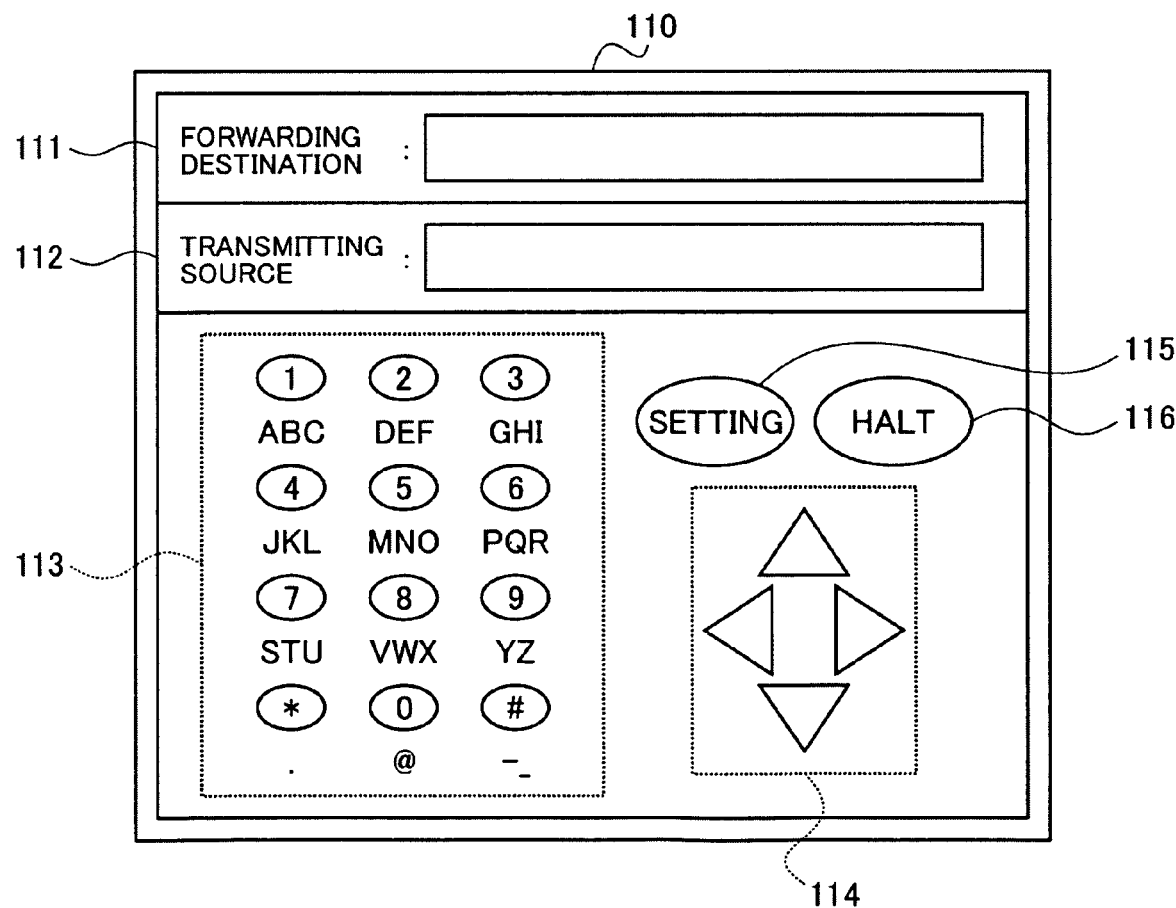
FIG. 5 is a schematic diagram illustrating an operation panel as an example of a forward setting unit.

Referring to FIG. 5, a description of an operation panel 110 serving as the forward setting unit 26 is provided. The operation panel 110 includes a forwarding destination input box 111 in which a forwarding destination address of the electronic mail is input, a source mail address input box 112 in which a mail address of transmitting source is input, a numeric keypad 113, a cursor key 114, a setting push button 115, and a halt push button 116.

After the user inputs prescribed mail addresses in the forwarding destination input box 111 and the source mail address input box 112, the setting push button 115 is pressed, so that the forwarding setting unit 26 receives the input of forward setting. Such a forward setting is stored in the forward setting storage unit 28 through the forward control unit 27. In a case where the user presses the halt push button 116, the forward setting unit 26 clears the mail addresses input in the forwarding destination input box 111 and the source mail address input box 112.

Referring to FIG. 6, a description of an example of the electronic mail is provided. Each of a first line through a seventh line indicates source information.

The first line indicates the mail address of the transmitting source of electronic mail. According to the example illustrated in FIG. 6, the transmitting source is the multifunctional peripheral C, and the mail address "c@example.com" of the multifunctional peripheral C is shown in the first line. A second line indicates the destination address of the forward mail. In the example illustrated in FIG. 6, the mail address "a@example.com" of the multifunctional peripheral A is shown in the second line. A third line indicates a subject of the forward mail. A fourth line indicates a time at which the forward mail is transmitted. A fifth line indicates that a format of the electronic mail is MIME (multipurpose Internet mail extension) version 1. A sixth line indicates that the electronic mail is text, and that "us-ascii" is being used as a text format. A seventh line indicates a forward history called "X-transfer" of the electronic mail. A value of the "X-transfer" is managed by the data control unit 13. In a case where the electronic mail is forwarded, the data control unit 13 searches a field called "X-transfer" in a heading of the mail. Where the "X-transfer" is not found, the data control unit 13 adds "X-transfer" in the heading of the mail. Where the "X-transfer" is found, the data control unit 13 adds the device ID of the multifunctional peripheral A in the field of "X-transfer." Particularly, in a case where the electronic mail is forwarded in order of the multifunctional peripheral A, the multifunctional peripheral B, and the multifunctional peripheral C as illustrated in FIG. 6, the value of "X-transfer" is "MFP-A>MFP-B->MFP-C." In a case where the multifunctional peripheral A forwards the electronic mail, the value of "X-transfer" is "MFP-A->MFP-B->MFP-C->MFP-A." An eighth line is a blank line for a line feed and indicates a border between the heading of the electronic mail and body text. A line beyond a ninth line indicates the body text of the electronic mail.

An example procedure for operation of the multifunctional peripheral A in a case of receiving such electronic mail is explained below with reference to a flowchart of FIG. 7. When the multifunctional peripheral A receives the forward mail through the transmitting-receiving unit 11, the transmitting-receiving unit 11 delivers the forward mail to the data control unit 13. Upon receiving the forward mail from the transmitting-receiving unit 11, the control unit 13 acquires the loop releasing ID stored in the loop releasing ID storage unit 22 (step S70) and compares with a loop identifier held by the forward mail. Where the loop releasing ID stored in the loop releasing ID storage unit 22 and the loop identifier held by the forward mail are congruent each other (Yes in step S70), the data control unit 13 deletes the electronic mail (step S71). Where the loop releasing ID stored in the loop releasing ID storage unit 22 and the loop identifier held by the forward mail are not congruent each other (No in step S70), the data control unit 13 supplies the instruction with respect to the loop press control unit 17 to judge whether or not the forward mail is the loop mail (step S72).

The loop process unit 17 refers to the value of "X-transfer" and judges whether or not the forward mail is the loop mail. Here, the loop process control unit 17 judges whether or not the forward mail is the loop mail based on which the value of "X-transfer" includes more than one device ID of device-self (e.g., in a case of the multifunctional peripheral A, the device ID is "MFP-A"). Consequently, where the value of "X-transfer" of the received electronic mail is "MFP-B->MFP-C," the loop process control unit 17 judges that the forward mail is not the loop mail. On the other hand, the value of "X-transfer" is "MFP-A->MFP-B->MFP-C," the loop process control unit 17 judges that the forward mail is the loop mail.

Where the forward mail is judged to be the loop mail (Yes in step S72), the loop process control unit 17 confirms whether the number of loop times of the forward mail reaches the upper limit value input in the loop upper limit input box 41 of the loop process setting unit 18 (step S73). Particularly, the loop process control unit 17 acquires the upper limit value of the number of loop times stored in the loop upper limit number storage unit 20 and compares with the number of loop times of the forward mail. Where the number of loop times of the forward mail is greater than the upper limit number of loop times stored in the loop upper limit number storage unit 20 (Yes in step S73), the loop process control unit 17 executes the loop mail process (step S74). An example procedure of the loop mail process in step S74 is described later with reference to a flowchart of FIG. 8.

Where the received forward mail is judged not to be the loop mail (No in step S72), and where the number of loop times of the forward mail reaches the upper limit number of loop times (No in step S73), the forward control unit 27 judges whether or not the received electronic mail is a target to be forwarded (step S75). The forward control unit 27 acquires the forward setting of the forward mail from the forward setting storage unit 28 and judges whether or not to forward the forward mail (step S75). Where the forward mail meets a forward condition (Yes in step S75), the forward control unit 27 supplies the instruction with respect to the data control unit 13 to forward the electronic mail. Upon receiving the instruction, the data control unit 13 supplies the instruction to the transmitting-receiving unit 11 to transmit the forward mail to the forwarding destination set by the forward setting unit 26. The transmitting-receiving unit 11 transmits the forward mail with respect to the forwarding destination of the electronic mail (step S76). On the other hand, where the received electronic mail does not meet the forwarding condition (No in step S75), the forward control unit 27 supplies the instruction with respect to the data control unit 13 to print the forward mail. Upon receiving the instruction, the data control unit 13 delivers the forward mail to the print unit 14, and subsequently the print unit 14 prints the forward mail (step S77).

Figure 7:
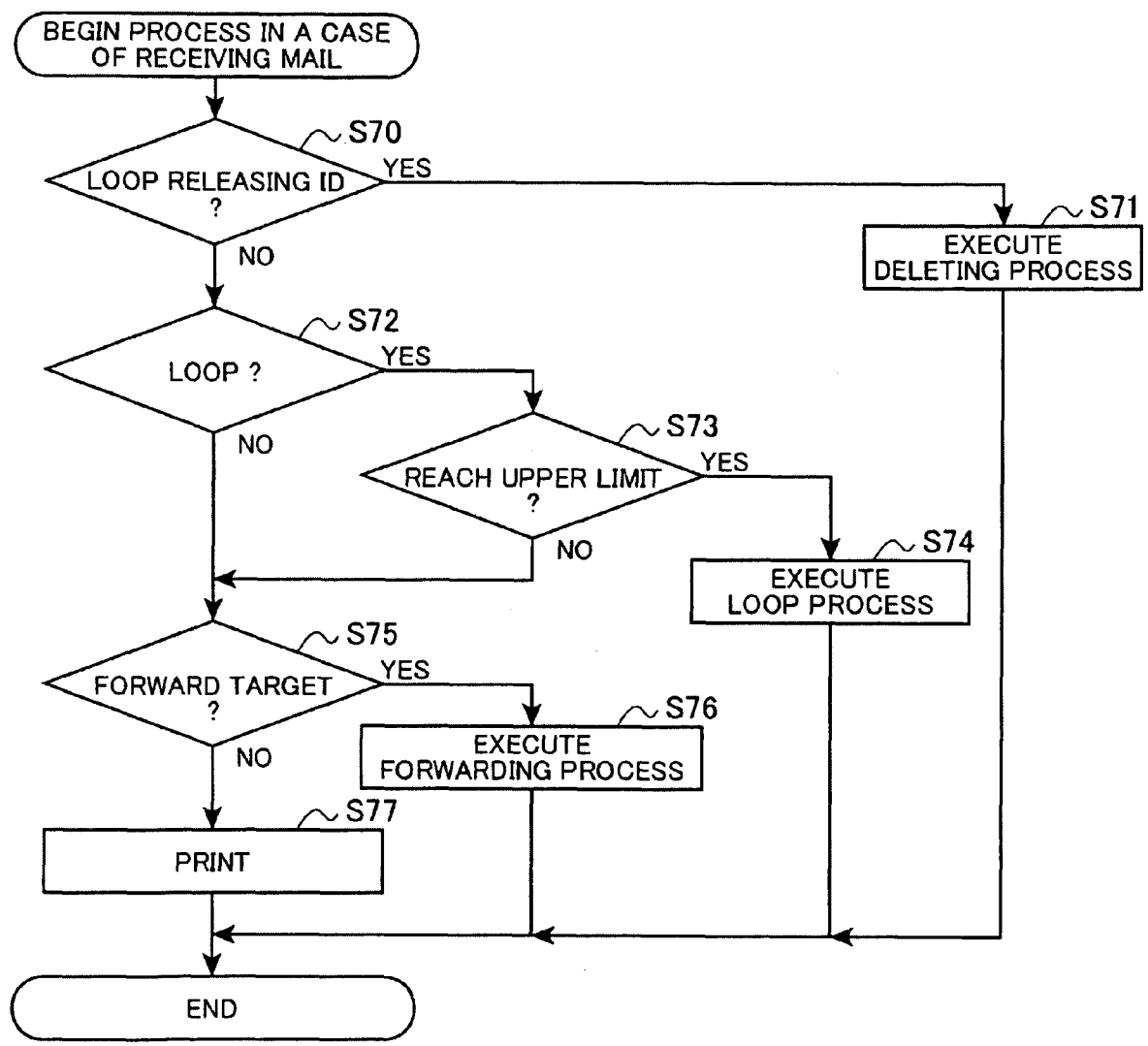
FIG. 7 is a flowchart illustrating an example procedure for operation of the multifunctional peripheral in a case of receiving electronic mail.
Figure 8:
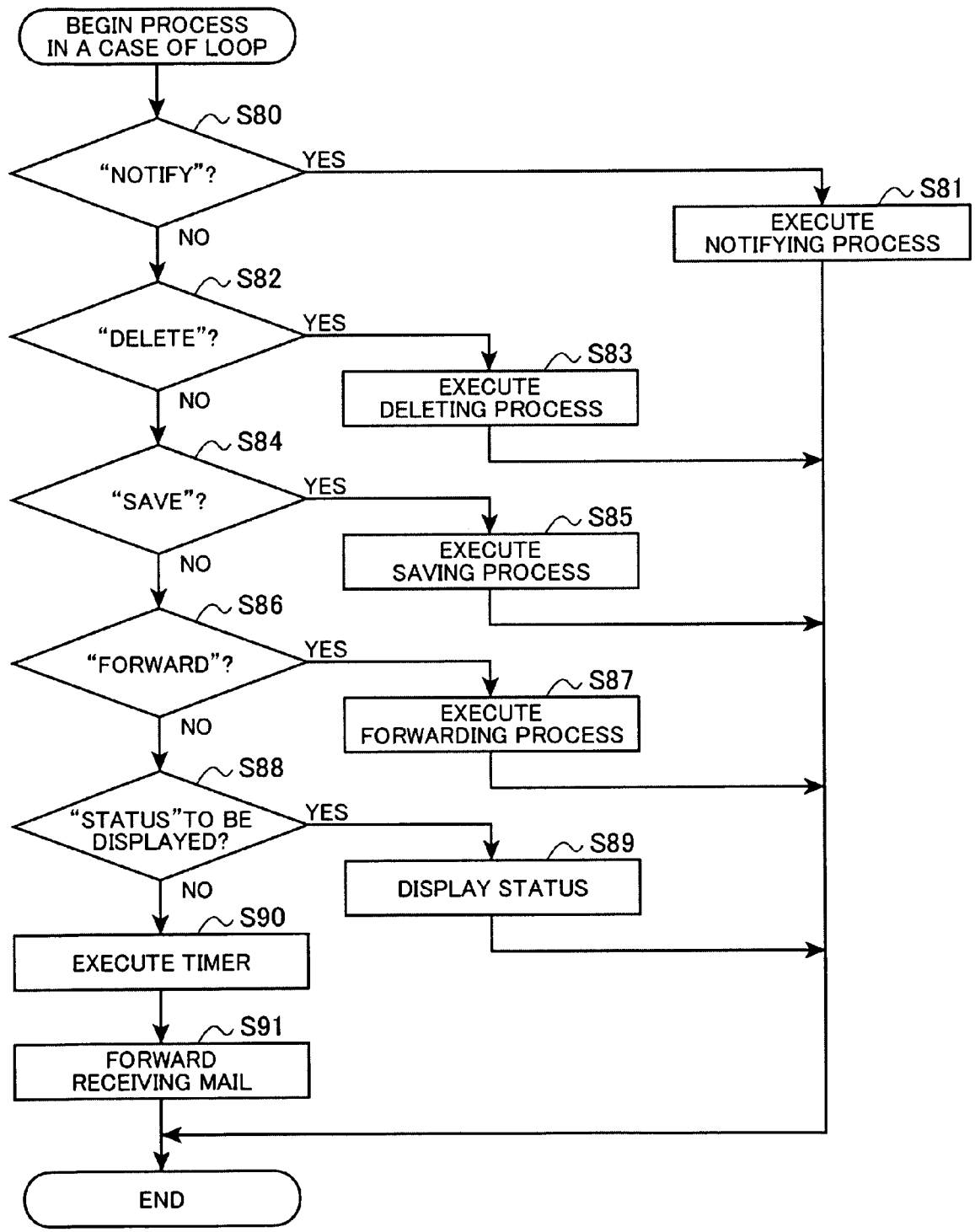
FIG. 8 is a flowchart illustrating an example procedure for loop mail process.

Referring to the flowchart of FIG. 8, the example procedure of the loop mail process in step S74 in the flowchart FIG. 7 is further described. The loop process control unit 17 confirms whether or not the notifying process is selected as the loop mail process in the loop process setting unit 18 by pressing the "NOTIFY" radio button 34 by the user (step S80). Where the notification process is selected by the user, the loop process control unit 17 acquires the mail address of the notifying destination from the notifying address storage unit 21 and creates the notification mail. When the notification mail is created, the loop process control unit 17 supplies the instruction with respect to the data control unit 13 to transmit the notification mail. Upon receiving the instruction, the data control unit 13 delivers mail address information of the notifying destination with the notification mail to the transmitting-receiving unit 11, and the transmitting-receiving unit 11 transmits the notification mail with respect to the mail address of the notifying destination (step S81). A further step of the flowchart of FIG. 8 is described later.

Referring now to FIG. 9, an example of the notification mail created by the loop process control unit 17 is illustrated. A first line indicates the mail address of the transmitting source of the notification mail. According to the example illustrated in FIG. 9, the transmitting source is the multifunctional peripheral A, and the mail address "a@example.com" of the multifunctional peripheral A is shown. A second line indicates the destination address of the notification mail. In the example illustrated in FIG. 9, the destination of notification mail is "user1@example.com." A third line indicates a subject of the notification mail. The subject includes a content indicating an occurrence of the loop mail, and also includes a loop identifier identifying the loop mail. In this example, "MFP-A-0001" is indicated as the loop identifier. A fourth line indicates a time at which the notification mail is transmitted. A fifth line indicates that a format of the notification mail is MIME version 1. A sixth line indicates that the notification mail is text, and that "us-ascii" is being used. A seventh line is a blank line for a line feed and indicates a border between the heading of the notification mail and body text. A line beyond an eighth line indicates the body text of the notification mail. Such body text of the notification mail describes deletion of the electronic mail having the same loop identifier retransmitted to the multifunctional peripheral A in a case of transmitting reply mail with respect to the notification mail. In a case of transmitting the reply mail, a cautionary statement not to delete "ID:MFP-A-0001" included in the subject is included. Moreover, loop mail body text is cited at an end of the body text.

Referring to FIG. 10, an example of the replay mail transmitted by the user with respect to the notification mail having the destination address of "user1@example.com" is illustrated. A third line of the reply mail includes "ID:MFP-A-0001." In a case of receiving the reply mail, the data control unit 13 stores the loop identifier of "MFP-A-0001" as the loop releasing ID in the loop releasing ID storage unit 22. In a case where the multifunctional peripheral A receives the mail having the loop identifier of "MFP-A-0001" again, the data control unit 13 deletes such mail.

After the notification mail is transmitted, the loop process control unit 17 supplies the instruction to the data control unit 13 to transmit the forward mail with respect to the mail address set by the forward setting unit 26. Here, the loop control unit 17 inserts the loop identifier included in the content notified by the notification mail.

Referring to FIG. 11, an example of the forward mail is illustrated. Such an example forward mail is provided with the transmission instruction from the loop mail process unit 17 after the notification mail is transmitted. A first line indicates the mail address of transmitting source of the forward mail. In the example illustrated in FIG. 11, the transmitting source is the multifunctional peripheral A, and the mail address "a@example.com" of the multifunctional peripheral A is shown. A second line indicates the mail address of destination of the forward mail. In the example illustrated in FIG. 11, the destination of forward mail is the mail address "b@example.com" of the multifunctional peripheral B. A third line indicates a subject of the forward mail. A fourth line indicates a time at which the forward mail is transmitted. A fifth line indicates that a format of the forward mail is MIME version 1. A sixth line indicates that the forward mail is text, and that "us-ascii" is being used. A seventh line is a forwarding history. An eighth line indicates the loop identifier inserted by the loop process control unit 17. Such a loop identifier is stored in the loop identifier storage unit 23. A ninth line is a blank line for a line feed and indicates a border between a heading of the forward mail and body text. A line beyond a tenth line indicates the body text of the forward mail.

Where the notification process is not selected by pressing the "NOTIFY" radio button 34 by the user as the loop mail process (No in step S80 in the flowchart of FIG. 8), the loop process control unit 17 confirms whether or not the deleting process is selected by pressing the "DELETE" radio button 35 by the user as the loop mail process (step S82). Herein, where the "DELETE" is selected, the loop process control unit 17 deletes the forward mail (step S83). Where the deleting process is not selected by the user (No in step S82), the loop process control unit 17 confirms whether or not the saving process is selected by pressing the "SAVE" radio button 36 by the user (step S84). Where the saving process is selected (Yes in step S84), the loop process control unit 17 saves the forward mail in the loop mail saving unit 24 (step S85). Where the saving process is not selected by the user (No in step S84), the loop process control unit 17 confirms whether or not the forwarding process is selected by pressing the "FORWARD" radio button 37 by the user (step S86). Where the forwarding process is selected (Yes in step S86), the loop process control unit 17 acquires the mail address to be the forwarding destination of the electronic mail from the loop mail forwarding destination storage unit 25 and supplies the instruction with respect to the data control unit 13 to transfer the mail. Upon receiving the instruction, the data control unit 13 delivers the mail address information of the forwarding destination with the forward mail, and the transmitting-receiving unit 11 forwards the forward mail with respect to the mail address of the forward destination (step S87). Where the forwarding process is not selected by the user (No in step S86), the loop process control unit 17 confirms whether or not the status display process is selected by pressing the "DISPLAY ON PANEL" radio button 38 (step S88). Where the status display process is selected (Yes in step S88), the loop process control unit 17 supplies the instruction with respect to the status display unit 19 to display a message of "LOOP MAIL IS RECEIVED." After such a message is displayed, the loop process control unit 17 supplies the instruction to the data control unit 13 to forward the forward mail.

Where any of the processes such as the notifying, deleting, saving, forwarding, and status display processes is not selected by the user in a case of looping the electronic mail, the forward control unit 27 sets a prescribed time in the timer 29 and starts the timer 29 (step S90). After the prescribed time period elapses, the timer 29 notifies the forward control unit 27 of elapsing of the prescribed time period. Upon receiving the notice from the timer 29, the forward control unit 27 supplies the instruction with respect to the data control unit 13 to forward the mail. Upon receiving the instruction, the data control unit 13 delivers the mail address information of the forwarding destination with the forward mail to the transmitting-receiving unit 11, and the transmitting-receiving unit 11 transmits the mail with respect to the mail address of the forwarding destination (step S91). The time to be set in the timer 29 by the forward control unit 27 can be a fixed time period or can be increased with respect to each loop. For example, the first time to be set in the timer 29 can be one (1) minute, and the time to be set in the timer 29 can be increased such as two (2), four (4), eight (8), sixteen (16), and thirty-two (32) minutes with respect to each loop repeated.

According to the first embodiment, where the loop mail is forwarded to the device-self through the plural devices within the network, the received electronic mail is judged whether or not to be the loop mail, thereby reducing occurrences of further forwarding the loop mail to any device based on the judgment result.

Second Embodiment

A network and essential elements of a multifunctional peripheral AA serving as an image forming apparatus according to a second embodiment are substantially similar to those of the multifunctional peripheral A according to the first embodiment. Elements and configurations of the multifunctional peripheral AA of the second embodiment that differ from those of the above first embodiment will be described, and like elements will be given the same reference numerals as above and description thereof will be omitted. In the second embodiment, operation of the multifunctional peripheral AA in a case of receiving forward mail is different from that of the first embodiment described above, and is described below with reference to FIG. 12 and FIG. 13.

Figures 12, 13:
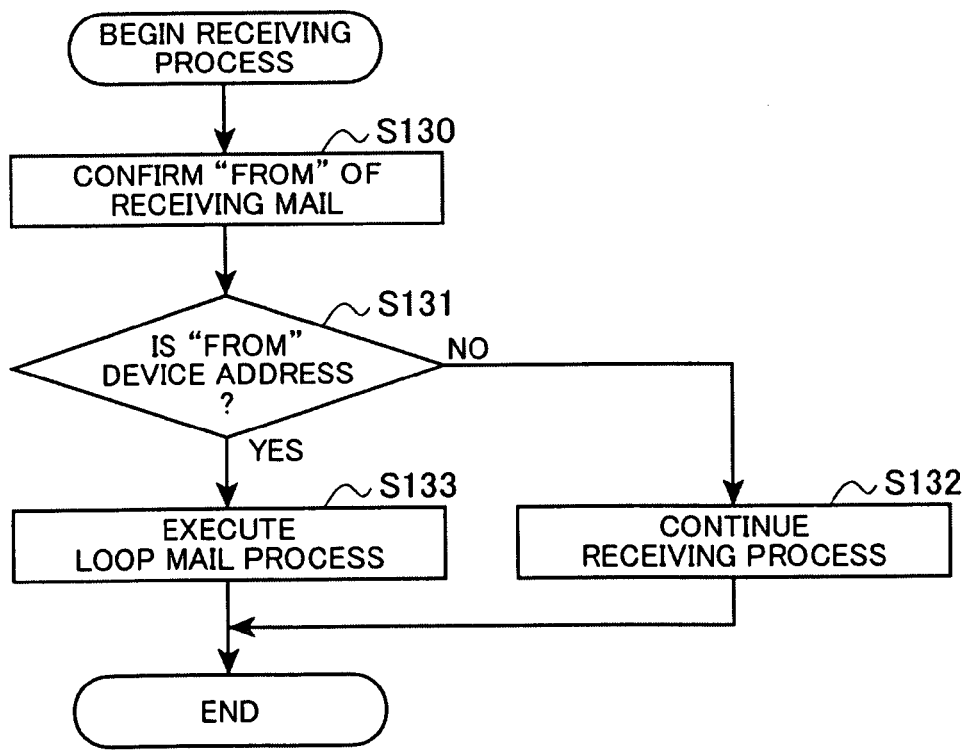
FIG. 12 is a schematic diagram illustrating an example of forward mail received by a multifunctional peripheral serving as an image forming apparatus according to a second embodiment of the present invention.
FIG. 13 is a flowchart illustrating an example procedure for operation of the multifunctional peripheral according to the second embodiment in a case of receiving electronic mail.

Referring to FIG. 12, an example of the forward mail received by the multifunctional peripheral AA is illustrated. A first line indicates a mail address of transmitting source of the forward mail received. In the example illustrated in FIG. 12, the transmitting source is the multifunctional peripheral AA, and the mail address "aa@example.com" of the multifunctional peripheral AA is shown. A second line indicates the mail address of forwarding destination. In the example forward mail illustrated in FIG. 12, a mail address "group1@example.com" shown in the second line does not indicate the mail address of the multifunctional peripheral AA. However, since the mail address "group1@exampl.com" represents a group including the mail address of the multifunctional peripheral AA, the mail is transmitted to the multifunctional peripheral AA without showing the mail address thereof in the second line. A third line indicates a subject of the forward mail. A fourth line indicates a time at which the forward mail is transmitted. A fifth line indicates that a format of the forward mail is MIME (multipurpose Internet mail extension) version 1. A sixth line indicates that the forward mail is text, and that "us-ascii" is being used. A seventh line is a blank line for a line feed and indicates a border between a heading of the received mail and body text A line beyond an eighth line indicates the body text of the forward mail.

Referring to a flowchart of FIG. 13, the operation of the multifunctional peripheral AA in a case of receiving the mail is illustrated. In a case where the multifunctional peripheral AA receives the mail through a transmitting-receiving unit 11, the transmitting-receiving unit 11 delivers the forward mail to a data control unit 13. Upon receiving the forward mail from the transmitting-receiving unit 11, the data control unit 13 supplies an instruction with respect to a loop process control unit 17 to confirm the mail address of transmitting source of the forward mail shown in a "from" line (i.e., the first line of FIG. 12) in the forward mail (step S130). Subsequently, the loop process control unit 17 acquires the mail address allocated to the multifunctional peripheral AA stored in a device address storage unit 16. The loop process control unit 17 compares the mail address shown in the forward mail with the mail address of device-self stored in the device address storage unit 16. Where the mail address shown in the forward mail and the mail address of device-self are congruent each other, the forward mail is judged to be the loop mail. On the other hand, where the mail address shown in the forward mail and the mail address of device-self stored in the device address storage unit 16 are not congruent each other, the loop process control unit 17 judges that the forward mail is not the loop mail (step S131).

Where the forward mail is judged not to be the loop mail (No in step S131), the loop process control unit 17 continues a receiving process described above in the first embodiment (step S132). Where the forward mail is judged to be the loop mail (Yes in step S131), the loop process control unit 17 executes a loop mail process described above in the first embodiment (step S133).

According to the second embodiment, in a case where a destination address such as a mailing list is designated as the forwarding destination of the forward mail, and the forward mail is not transmitted to the mail address of device-self, the forward mail can be judged whether or not to be the loop mail. Therefore, in a case where the loop mail is forwarded to the device-self through a plurality of devices within the network, the electronic mail received can be judged whether or not the loop mail, thereby reducing occurrences of further forwarding the loop mail to any device based on a judgment result.

Third Embodiment

A network and essential elements of a multifunctional peripheral AAA serving as an image forming apparatus according to a third embodiment are substantially similar to those of the multifunctional peripheral A according to the first embodiment. Elements and configurations of the multifunctional peripheral AAA of the third embodiment that differ from those of the above first embodiment will be described, and like elements will be given the same reference numerals as above and description thereof will be omitted. In the third embodiment, setting operation in a forward setting unit 26 of the multifunctional peripheral AAA is different from that of the first embodiment described above.

An operation panel 110 serving as an example of the forward setting unit 26 according to the third embodiment is substantially the same as the operation panel 110 described above with reference to FIG. 5 in the first embodiment. Similar to the first embodiment, the operation panel 110 includes a forwarding destination input box 111 in which the mail address of a forwarding destination is input and a source mail address input box 112 in which the mail address of a transmitting source is input. A content to be input in each of the forwarding destination input box 111 and the source mail address input box 112 according to the third embodiment is substantially the same as that to be input in each of the address input boxes 111 and 112 described in the first embodiment. Each of a numeric keypad 113, a cursor key 114, a setting push button 115, and a halt push button 116 of the operation panel 110 according the third embodiment is substantially the same as that of the operation panel 110 described in the first embodiment.

Figure 14:
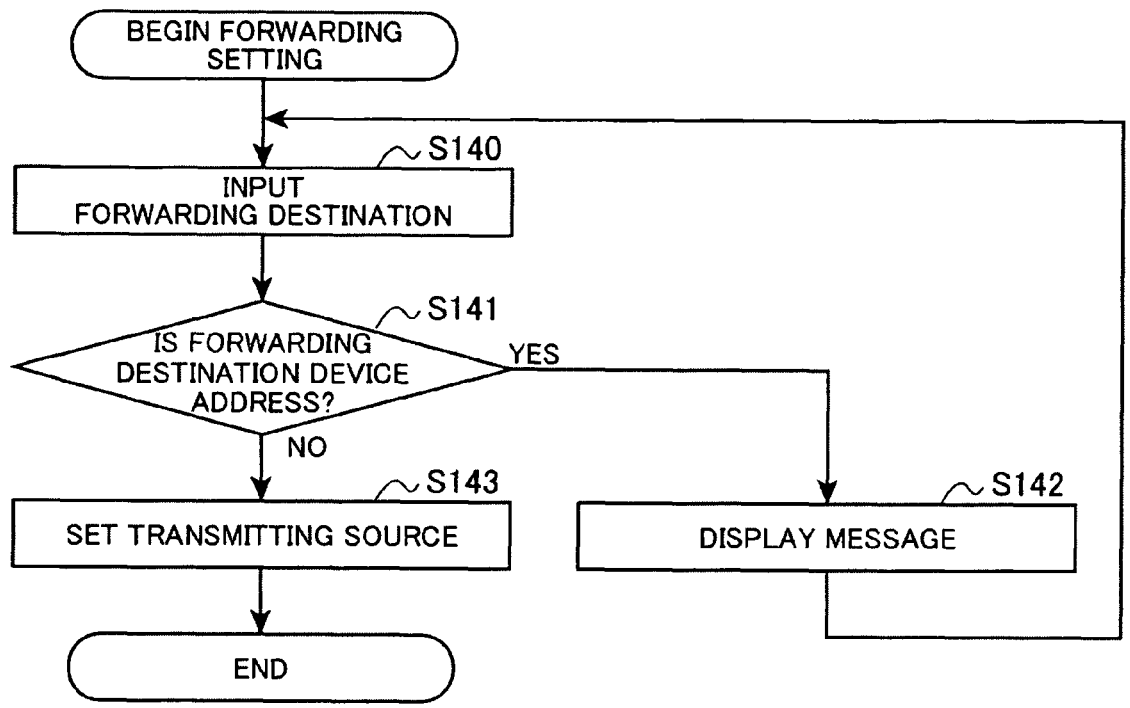
FIG. 14 is a flowchart illustrating an example procedure for operation of a multifunctional peripheral according a third embodiment of the present invention in a case of forward setting.
Figure 15:
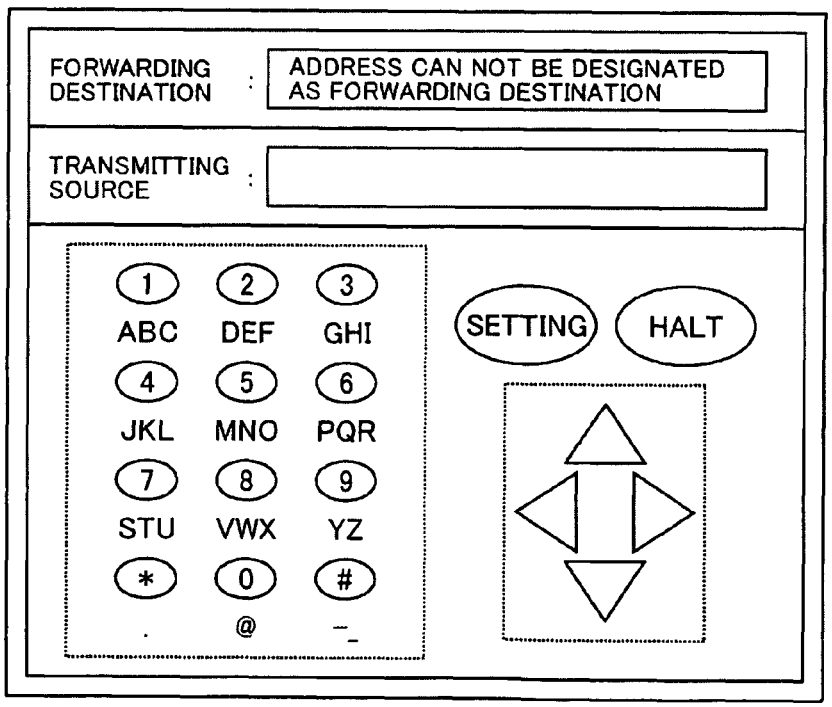
FIG. 15 is a schematic diagram illustrating an example of a message.

Referring to a flowchart of FIG. 14, the operation of forward setting using the operation panel 110 of the multifunctional peripheral AAA according to the third embodiment is illustrated. In a case where a user inputs the forward destination of the mail in the forwarding destination input box 111 using the numeric keypad 113 and the cursor key 114 of the operation panel 110 (step S140), a forward control unit 27 compares a mail address stored in a device address storage unit 16 with the mail address input by the user (step S141). Where the mail address stored in a device address storage unit 16 and the mail address input by the user are congruent each other (Yes in step S141), the forward control unit 27 supplies an instruction to the operation panel 110 to display, for example, a message as shown in FIG. 15 in the forwarding destination input box 111 (step S142). Upon receiving the instruction, the operation panel 110 displays the message "ADDRESS IS NOT DESIGNATED AS FORWARDING DESTINATION" in the forwarding destination input box 111. After the message is displayed for a certain time period, the forward control unit 27 clears the forwarding destination address input by the user.

Where the mail address stored in the device address storage unit 16 and the mail address input by the user are not congruent each other (No in step S141), the forward control unit 27 accepts an input setting of the forward destination address input by the user and stores such mail address in the forward setting storage unit 28. Substantially, the operation panel 110 receives an input of the transmitting source address. In a case where the user inputs the mail address of the transmitting source using the numeric keypad 113 and the cursor key 114, the forward control unit 27 accepts such an input setting and stores such mail address in the forward setting storage unit 28 (step S142). Here, the forwarding process is finished.

According to the third embodiment, where the mail address stored in the device address storage unit 16 and the mail address input by the user are congruent each other, the forward control unit 27 clears the forwarding destination address input by the user. However, the forward control unit 27 can perform another operation. For example, after supplying the instruction to the operation panel 110 to display the message "ADDRESS IS NOT DESIGNATED AS FORWARDING ADDRESS" for the certain time period, the forward control unit 27 can forcefully execute a specific process (e.g., by supplying an instruction to print the received mail or an instruction to save the received mail in device-self) in a case of receiving target mail to be forwarded without clearing the forwarding destination address input by the user.

According to the third embodiment of the present invention, the multifunctional peripheral AAA serving as the image forming apparatus can reduce occurrences in which the electronic mail falls into the infinite loop state, for example, forwarding the electronic mail to the device-self, beforehand at a phase of the forward setting.

In each of the first, second, and third embodiments, the image forming apparatus of the present invention is described using the multifunctional peripheral as an example. However, the present invention is not limited thereto and can be applied to a scanner, a photocopier, a facsimile machine, a printer and the like.

The invention has been described above with regard to particular embodiments, but the invention is not limited thereby and it must be understood that the invention encompasses all modifications possible not departing from the scope of the invention.

What is claimed is:

1. An image forming apparatus for transmitting and receiving electronic mail within a network, the image forming apparatus comprising:

a non-transitory computer readable storage medium, said medium storing an identification information storage unit storing identification information on said medium;

a loop mail judgment unit for judging whether or not the received electronic mail is loop mail, based on the identification information stored in the identification information storage unit; and a loop mail process control unit, configured to forward the received electronic mail if the loop mail judgment unit judges that the received electronic mail is loop mail, and responsive to a forwarding selection to forward the loop mail to a mail address set beforehand as a shelter destination of loop mail such that loop mail in an infinite loop state escapes from said infinite loop state, the loop mail process control unit further including:

a loop upper limit number storage unit, configured to store an upper limit number of loops, wherein the loop mail process control unit is configured to execute a loop mail process when a number of loops of the received electronic mail exceeds the number of loops stored in the loop upper limit number storage unit, and a notifying address storage unit, wherein, when the loop mail process is executed, the loop process control unit is configured to confirm whether or not a notifying process is selected by a user, to acquire a mail address of a notifying destination from the notifying address storage unit, and to create and transmit a notification mail to the notifying destination.

2. The image forming apparatus according to claim 1 comprising:

an identification information addition unit for adding the identification information to the received electronic mail;

a transmission unit for transmitting the electronic mail with the identification information added by the identification information addition unit; and a reception unit for receiving the transmitted electronic mail, wherein the loop mail judgment unit judges whether or not the transmitted electronic mail that is received is loop mail based on the identification information included in the transmitted electronic mail.

3. The image forming apparatus according to claim 1, wherein the loop mail judgment unit judges whether or not the received electronic mail is loop mail based on at least a certain amount of identification information included in the received electronic mail.

4. The image forming apparatus according to claim 1, wherein the identification information is a mail address, and wherein the loop mail judgment unit judges whether or not the received electronic mail is loop mail based on a mail address included in a source of the received electronic mail.

5. The image forming apparatus according to claim 1, wherein the loop mail process control unit in response to a notifying selection to notify a mail address arranged beforehand of a reception of the received electronic mail, transmits the electronic mail if the loop mail judgment unit judges that the received electronic mail is loop mail.

6. The image forming apparatus according to claim 1, wherein the loop mail process control unit in response to a deleting selection to delete the received electronic mail, deletes the electronic mail if the loop mail judgment unit judges that the received electronic mail is loop mail.

7. The image forming apparatus according to claim 1, wherein the loop mail process control unit in response to a saving selection to save the received electronic mail, saves the electronic mail if the loop mail judgment unit judges that the received electronic mail is loop mail.

8. The image forming apparatus according to claim 1 comprising:

an address input unit that has an input including a mail address of an electronic mail forwarding destination;

a comparison unit for comparing the mail address of the electronic mail forwarding destination with a mail address stored in the identification information storage unit; and a control unit for rejecting an input to the address unit based on a comparison result by the comparison unit.

9. The image forming apparatus according to claim 1, wherein the loop mail process control unit notifies a user that the received electronic mail is loop mail, and deletes the received electronic mail based on a response to the notification.

10. The image forming apparatus according to claim 1, further comprising a loop upper limit number storage unit that stores an upper limit number of loops, wherein the loop mail process control unit is configured to forward loop mail in response to the forwarding selection when a number of loops of the received electronic mail exceeds the number of loops stored in the loop upper limit number storage unit.

11. The image forming apparatus according to claim 1, further comprising a timer that measures a prescribed time from a receipt time of the received electronic mail if both the loop mail judgment unit judges that the received electronic mail is loop mail and a loop mail process is not executed by the loop mail process control unit, the prescribed time increasing with a number of loops of the received electronic mail.

12. The image forming apparatus according to claim 1, further comprising a timer that measures a prescribed time from a receipt time of the received electronic mail if both the loop mail judgment unit judges that the received electronic mail is loop mail and the received electronic mail is not forwarded by the loop mail process control unit, the prescribed time increasing with a number of loops of the received electronic mail.

* * * * *